UNITED STATES PATENT OFFICE.

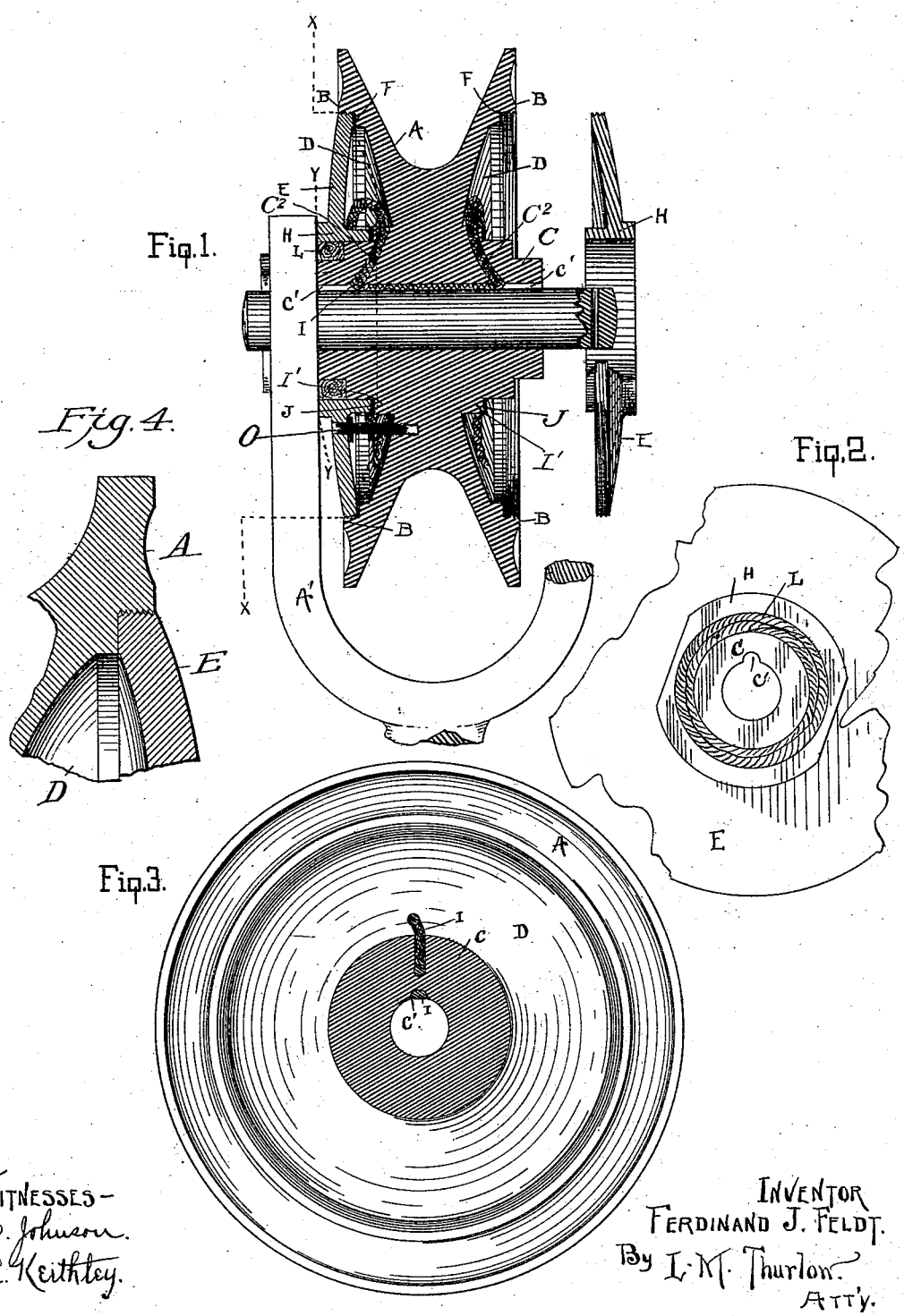

FERDINAND J. FELDT, OF PEORIA, ILLINOIS, ASSIGNOR OF ONE-HALF TO ARTHUR HOKLAS, OF SAME PLACE.

TROLLEY-WHEEL.

SPECIFICATION forming part of Letters Patent No. 548,704, dated October 29, 1895.

Application filed April 20, 1895. Serial No. 546,474. (No model.)

*To all whom it may concern:*

Be it known that I, FERDINAND J. FELDT, a citizen of the United States, residing at Peoria, in the county of Peoria and State of Illinois, have invented certain new and useful Improvements in Trolley-Wheels; and I do hereby declare that the following is a full, clear, and exact description of the invention, which will enable others skilled in the art to which it appertains to make and use the same.

This invention relates to improvements in trolley-wheels for electric cars, and has for its object to provide a trolley with means for feeding oil to the bearing continuously and thus preventing the rapid wearing out of the parts.

In the annexed drawings, Figure 1 represents a cross-section of the wheel. Fig. 2 is a side view of the wheel on line $y\ y$, Fig. 1. Fig. 3 is cross-section of the wheel-hub through line $x\ x$, Fig. 1. Fig. 4 is a sectional view of portion of wheel and cap, showing joint between same.

A represents the wheel, having the threaded shoulders B and the shouldered hub C. The wheel is provided with a recess D on each side thereof which surrounds the hub. Each outer end of said recess is closed by a threaded cap E, as shown, which engages the threaded shoulder B, above referred to. A packing-ring F is placed between the shoulder and the plate to make the joint perfect. Each cap or plate is also bored out at its center to fit over the hub C of the wheel and carries a hub H of its own. The inner end of the hub H bears up against the shoulder I' of the wheel, and a packing-ring J makes the joint safe against leakage. The outer end of each hub H is flush with the extremity of the hub C, and the resulting annular space caused by the shouldering of said hub C is filled with wicking L, while the arm of the trolley-fork A' bears against the wheel-hub and keeps the wicking L in place.

The hub C of the wheel is provided with a channel C' in its bore. Said channel communicates with channel $C^2$ through the hub, substantially as shown, and opens into the recess D on each side of the wheel. A wick I fills the channel, and the ends thereof terminate and lie within the said chamber D. The recesses now being filled with oil and the caps or plates screwed home, there is no chance for leakage. The wick then feeds the shaft with a steady supply of oil. By gaging the size of the wick the oil-feed is regulated. The purpose of the wick L in the hub C is to absorb any oil passing out around the shaft and to keep the portion of the fork lubricated which comes in contact with the wheel-hub.

A threaded plug or stopper O is provided, which screws into the body of the wheel and whose outer extremity is provided with a flange and with a slot to receive a screwdriver. A hole is drilled in the cap E, by which the said stopper is reached by the use of the said screwdriver. The object of this stopper is to provide means for admitting oil to the recess instead of removing the cap bodily. When the stopper is in position to close the hole in the cap E, the flange bears up against the under side of said cap, and when opening the hole the stopper is turned to the right or in a direction to carry the flange away from the opening. Both sides of the wheel may be fitted with this stopper, if desired.

What I claim as new, and desire to secure by Letters Patent, is—

In a trolley wheel, the body A having the oil recess D formed in each side thereof, the hub C having the oil channel passing along its bore and communicating with the oil receptacles D, a wick lying in said channel, and the plates or caps E for closing said oil receptacles substantially as and for the purposes set forth and described.

In testimony whereof I affix my signature in presence of two witnesses.

FERDINAND J. FELDT.

Witnesses:
C. JOHNSON,
A. KEITHLEY.